United States Patent [19]

Eddy et al.

[11] 4,052,538

[45] Oct. 4, 1977

[54] METHOD OF MAKING SODIUM BETA-ALUMINA POWDER AND SINTERED ARTICLES

[75] Inventors: David S. Eddy, Romeo; James F. Rhodes, Hartland, both of Mich.

[73] Assignee: General Motors Corporation, Detroit, Mich.

[21] Appl. No.: 678,063

[22] Filed: Apr. 19, 1976

[51] Int. Cl.$^2$ .................... H01M 6/18; C04B 35/64
[52] U.S. Cl. .................... 429/193; 423/600; 264/56; 106/73.4
[58] Field of Search .......... 429/191, 193, 104, 33, 429/189; 423/600; 264/56; 106/73.4

[56] References Cited

U.S. PATENT DOCUMENTS 3,795,723   3/1974   Clendenen .................... 429/191

OTHER PUBLICATIONS

Weiner (I), Research on Electrodes and Electrolytes for the Ford Sodium-Sulfur Battery, National Science Foundation, NSF-C805, July 1975, Annual Report for 6/30/74–6/29/75.

Weiner (II), Research on Electrodes and Electrolyte for the Ford Sodium-Sulfur Battery, National Science Foundation, NSF-C805 Semi-annual report for 6/30/74–12/31/74, Jan. 1975.

Dispol "M" Alumina for Ceramics Continental Oil Co. Bulletin, published by Hammill Gillespie, Inc., N.Y., N.Y.

*Primary Examiner*—Donald L. Walton
*Attorney, Agent, or Firm*—George A. Grove

[57] ABSTRACT

In a preferred embodiment a sintered sodium beta-alumina article is made by forming an aqueous acidic colloidal solution (sol) of a dispersible alpha-alumina monohydrate, adding an aqueous solution of an inorganic oxygen-containing sodium salt to the sol to form a thixotropic gel in which the molar ratio of alumina to sodium oxide is in the range of 5 to 11, spray drying the gel to form a free flowing powder, pressing the powder into an article of predetermined shape, heating the pressed article to drive off volatile material, and then sintering the article at a temperature to form a densified sodium beta-alumina structure. When desired, water soluble oxygen-containing inorganic salts of metals such as lithium or magnesium may be added to the sol to form a modified (doped) sodium beta-alumina composition.

6 Claims, No Drawings

METHOD OF MAKING SODIUM BETA-ALUMINA POWDER AND SINTERED ARTICLES

This invention relates to a practical method of forming sodium beta-alumina compositions and sintered articles of the beta-alumina type.

Considerable attention is being focused on high energy density secondary batteries that operate at elevated temperatures. One such battery is the sodium-sulfur battery in which thin ceramic members of beta-alumina separate the molten sodium and sodium polysulfide electrodes. The sodium beta-alumina separators are solid ceramic materials that must have adequate mechanical strength and low resistivity to positively charged sodium ions at cell operating temperatures of 300° to 400° C. Considerble effort is now being expended to find practical and economical ways of making such separators.

As is known, there is a family of alumina-rich polycrystalline ceramic materials that are the reaction product of alumina and sodium oxide. They are known generically as "beta-alumina" or "sodium beta-alumina" and have the general formula $Na_2O.xAl_2O_3$ for values of $x$ from about 5 to 11. For $x > 7.9$ the beta phase predominates. It is a layered hexagonal crystal structure. For $x > 7.9$ the beta" phase predominates and sodium aluminate may be present. The beta" phase of beta-alumina has a layered rhombohedral crystal structure. The relative proportions of the beta and beta" phases are also dependent to some extent on the thermal history of the material as well as the presence of minor proportions of other constituents, such as the oxides of lithium or magnesium. As used herein, the term "beta-alumina" is generic to both the beta and beta" phases unless the contrary is clearly indicated.

One method of making polycrystalline beta-alumina ceramics has been to prepare a uniform mixture of the powdered basic oxides $Na_2O$, alpha-$Al_2O_3$ and optionally $Li_2O$ or $MgO$, or more typically a mixture of powdered compounds that will yield these oxides, and then calcine the mixture to effect the reaction and crystalline transformation to beta-alumina. A drawback of this method is that a uniform mixture of the powdered compounds is obtained by extensive milling which requires a considerable period of processing time, is usually difficult to control and reproduce, and typically introduces contaminants from the ball mill into the ceramic product.

It has also been proposed to form a homogeneous solution of collodial suspension of suitable aluminum and sodium compounds and subsequently coprecipitate a mixture of aluminum and sodium compounds or form a gel thereof. The resulting gel or coprecipitate is then dried and fired to convert the compounds to the respective powdered oxides, which in turn are calcined at a higher temperature to form beta-alumina. These methods have involved the use of organic materials as soluble aluminum salt formers or complexing agents. Such organic materials, including citric acid and oxalic acid, are expensive and must be oxidized in the processing. Moreover, in the case of prior gel formation procedures, the gel has required long drying times for conversion to a calcinable solid mixture. In short, all of the above procedures have been time consuming, or required expensive processing materials that are destroyed in the process, or have introduced contaminants.

It is an object of the present invention to provide a practical and economical method of forming a powder mixture of precursor materials that can be converted by calcination into beta-alumina, which method includes uniform mixing of the constituents in suitable inorganic chemical form in an aqueous colloidal solution which is readily dried to the powder mixture. The subject method requires no organic materials, not lengthy milling, and does not tend to introduce contaminants into the beta-alumina product.

It is a further object of our invention to provide a method of forming a shaped and sintered beta-alumina article by starting with an aqueous dispersion of alpha-alumina monohydrate, a suitable oxygen-containing, inorganic, water soluble sodium compound and optionally a modifier element such as lithium or magnesium, drying (preferably spray drying) the resulting viscous dispersion or gel to form a powder of beta-alumina precursor materials and processing the powder into a shaped and sintered beta-alumina article of desired configuration.

In accordance with a preferred embodiment of our invention, these and other objects and advantages are accomplished by first forming a colloidal dispersion (sol) of a suitable water dispersible alpha-alumina monohydrate in a relatively dilute aqueous solution of nitric acid. An aqueous solution of an oxygen-containing inorganic sodium salt, such as sodium carbonate, sodium nitrate, or preferably sodium hydroxide, is prepared. Optionally, small amounts of water soluble oxygen-containing inorganic salts of magnesium and/or lithium may be added to the solution. The amount of sodium salt (and optionally the other salts) employed is determined to be that which would provide an $(Al_2O_3 + Li_2O + MgO)/Na_2O$ molar ratio in the range of about 5 to 11 when mixed with the alpha-alumina monohydrate sol.

The solution of sodium salt is added to the alumina dispersion with suitable stirring to form a uniform mixture which soon thickens to a gel or gel-like consistency. The thickened mixture is stirred long enough to assure uniform distribution of all the constituents. All of the steps up to this point may be carried out at normal room temperature and pressure.

The mixture is then dried by any suitable means, such as freeze drying or preferably spray drying. When spray dried, the mixture is discharged through an atomizer into a large chamber traversed by a stream of hot air which rapidly vaporizes the water and other volatile materials and precipitates a dry, free flowing powder made up of small microspheres. The powder contains in uniform mixture the precursor materials that, upon heating to a suitable elevated temperature, interact to form a desired sodium beta-alumina. Where suitable, this powder may be mixed with a smaller amount of another material formulated to serve as a sintered aid to increase densification of a beta-alumina ceramic body.

A quantity of the powder is placed in a suitable mold and pressed, or otherwise shaped, into a desired form, such as a thin-wall closed-end tube separator, for employment in a sodium-sulfur battery. The green pressed tube or other article is heated to a first relatively low elevated temperature to drive out volatile materials such as water and products of salt decomposition. The pressed body is then heated to a second higher elevated temperature, typically above about 1100° C., to react the powdered precursor materials and to sinter and densify the pressed body. Where sintering and reaction are both to be accomplished, it is preferred to heat the pressed body to a temperature of about 1550° to 1600° C. This processing produces a sodium beta-alumina article having a density of 95% to 100% of its theoretical density. Depending upon whether small amounts of lithium oxide or magnesium oxide producing compounds or the like have been included in the composition, and depending upon the extent and nature of the heat treatment, the product will contain the beta phase or beta" phase of sodium beta-alumina or mixtures thereof together with sodium aluminate.

Other objects and advantages of our invention will be more fully appreciated from a detailed description thereof which follows.

The practice of our invention will be further illustrated by describing a first example in which thin-wall closed-end tube ceramic separators of predominantly beta phase beta-alumina are made to serve in a sodium-sulfur battery to separate the molten sodium and sodium polysulfide electrodes. Such separator tubes must provide high mechanical strength and low sodium ion resistivity at cell operating temperatures of 300° to 400° C. In this example it was desired to produce a sodium beta-alumina having the formula $Na_2 \cdot 8Al_2O_3$.

The source of the alumina was a high surface area (300–400 m²/g) alpha-alumina monohydrate which is commercially available under the designation "Dispal "M""from the Continental Oil Company. This alpha-alumina monohydrate (Boehmite, or possibly pseudo-Boehmite because it is synthetic) is quite pure (although it contains about 10% free water) and has the property of forming stable colloidal dispersions (sols) in dilute aqueous acid solutions. Four hundred grams of Dispal "M" alpha-alumina monohydrate having an alumina ($Al_2O_3$) assay of 75.94% by weight was dispersed in 2400 milliliters of distilled water containing 32 grams concentrated (70%) nitric acid. Also dispersed with the alumina was one gram Seatex HCB, a ceramic binder material which is a colloid derived from kelp scum and sold by Marine Colloid, Inc. The use of the Seatex is not required.

In a separate container 67.5 grams sodium carbonate (having an $Na_2O$ assay of 58.48%) were dissolved in 368 milliliters distilled water. The sodium carbonate solution was poured with stirring into the alumina sol. The sol effervesced mildly and soon thickened into what appeared to be a thixotropic gel. The gel or thickened mixture was blended for an additional ten minutes to assure that complete mixing had been obtained.

The gel was then transported using a peristaltic pump into a conventional laboratory spray dryer (Anhydro, Inc., Model No. 1) at a rate of 25 milliliters per minute. The air pressure on the spray nozzle was set at 138 kPa (20 psi). The inlet and outlet air temperatures were 240° C. and 120° C., respectively. The spray drying process produced a free flowing white powder made up of small microspheres having an average diameter of about $10\mu$ and a range of diameters of about $1-20\mu$.

A portion of the powder was molded into closed-end separator tubes employing a wet-bag isostatic pressing technique. A rubber tube mold was employed having a cylindrical tube portion, an end cap portion for closing one end of the tube, and a mandrel portion to fit inside the tube portion and define a hollow cylinder with one closed end. The cavity or fill space of the mold had dimensions 1.0 cm ID by 1.5 cm OD by 20.6 cm. During the filling of the mold with the spray-dried powder the mold was mounted on a vibrating table to insure optimum filling. After the mold was apparently full it was vibrated for an additional 20 minutes to insure maximum settling of the powder into the mold. A perforated metal sleeve was placed over the mold and the mold was then placed in th pressure chamber of a hydraulic isostatic press. A hydrostatic pressure of 172 MPA (25 kpsi) was employed during the pressing operation. Upon removal of the mold from the pressure chamber and disassembly the pressed tube was removed from the mandrel. Green pressed, closed-end tubes formed in this manner had dimensions of 1.0 cm ID by 1.33 cm OD by 20.6 cm.

The sintering of the pressed tubes was done in two separate operations. First, several tubes were placed in a conventional box kiln and the temperature raised slowly to 800° C. at a rate of 100° C. per hour. The kiln was then cooled at a rate of 300° C. per hour. During this sintering step the Seatex HCB binder was burned out and other volatile materials driven off. During these heating and cooling steps the kiln was purged with dry air to avoid exposure of the tubes to atmospheric moisture.

A high temperature sintering process was then employed utilizing a tube furnace having a high temperature region maintained at 1600° C. The ceramic tubes were placed inside a platinum tube enclosure and a platinum cap was placed over the end of each tube to make a suitable seal. The tubes were thus enclosed to restrict evaporation of $Na_2O$ from the beta-alumina tube during sintering. The platinum tube enclosure was towed through the high temperature tube furnace at a rate such that the residence time of the ceramic time in the high temperature zone was approximately 23 minutes.

The dimensions of a typical sintered tube were 1.01 cm OD by 0.792 cm ID by 15.4 cm long. The density of the sintered tubes were determined by a weighing and immersiondisplacement method using xylene as the immersant. Measured densities ranged from 3.14 to 3.20 g/cm³. Based on the generally recognized full density of 3.26 g/cm³, the measured values ranged from 96.3% to 98.2% of this value. The sintered sodium beta-alumina tubes were examined on an x-ray diffractometer using $CuK\alpha$ radiation. The relative intensities of the 33.4°$\beta$ peak and the 34.6°$\beta''$ peak were used to determine the relative amounts of these two phases. The x-ray patterns clearly showed the beta phase was dominant in the sintered beta-alumina tubes. A trace amount of the beta" phase was present.

Electrical resistivity measurements were made both in the radial direction of the tubes and in the lengthwise direction. At a temperature of 350° C. the resistivity of the sintered tubes in the radial direction was 36 ohm/cm plus or minus 10% and in the lengthwise direction 19 ohm/cm plus or minus 5%.

Mechanical fracture strength was determined by a short section of beta-alumina tube between two platens in an Instron tensile test machine. Using the fracture load and the geometry of the specimen, the mechanical fracture strength is calculated. By this procedure a fracture strength of 260 MPa (38 kpsi) ± 20% was determined. The strain rate during the test was fixed at $8.5 \times 10^{-4} S^{-1}$.

In a second example, beta-alumina separator tubes for a sodium-sulfur battery having an overall composition by weight of 9.0% sodium oxide, 0.8% lithium oxide and the balance alumina were prepared. In general, the procedures were the same as in the first example above and the tubes were the same shape and size. The composition was formulated so that the molar ratio of ($Al_2O_3$ + $Li_2O$)/$Na_2O$ was 6.278.

Specifically, 400 grams Dispal "M" alpha-alumina monohydrate (assaying 74.05% by weight $Al_2O_3$) were dispersed in 2400 milliliters distilled water containing 32 grams concentrated (70%) nitric acid. To 368 milliliters of water were added 38.54 grams sodium hydroxide (assaying 76.71% $Na_2O$) and 12.22 grams lithium nitrate (assaying 21.55% $Li_2O$).

The solution of sodium hydroxide and lithium nitrate was added to the alumina sol with mixing as in the above example to form a gel. The gel was spray dried in the same apparatus as previously employed. The inlet air temperature was 200° C. and the outlet temperature 98° C. The gel was pumped into the spray dryer at a rate of 25 milliliters per minute. A free flowing white powder of microspheres was obtained wherein the diameter of the spheres ranged from 1 to 25 microns with an average of about 10 microns.

A number of separator tubes with one closed end were molded using the molds described above. Isostatic hydraulic pressure was applied to the mold at a pressure of 260 MPa (37 kpsi). The green pressed tubes were dried in a vacuum oven at 270° C. for about 1 hour and were sintered in a tube furnace having a sintering zone maintained at 1550° to 1600° C. and an adjacent downstream annealing zone maintained at 1400° to 1550° C. The tubes, encased in a platinum vessel as described above, were pulled through the tube furnace such that the residence time in the high temperature zones was about 20 to 30 minutes.

The density of the lithium oxide modified sodium beta-alumina tubes was found to be in the range of 3.10 to 3.20 g/cm³. The resistivity of the tubes in the lengthwise direction at 350° C. was 3 to 6 ohm-cm. The tubes were examined by x-ray diffraction as described above. It was found that the beta" phase of sodium beta-alumina predominated. There was a trace of the beta phase.

A significant basis of our process is the utilization of a water dispersible alpha-alumina monohydrate to form an alumina sol with which the other constituents of the beta-alumina can easily be mixed. Suitable alpha-alumina monohyrates are those that have been formed with a high surface area, typically 300–400 m²/g. They are preferably essentially pure, except that they may contain some water apart from the water of hydration. Aluminas of this type have the property of forming stable colloidal aqueous dispersions in a dilute inorganic mineral acid. For example, an aqueous sol or dispersion containing up to 25% by weight Dispal "M" can be formed by using up to 1% to 1.5% by weight concentrated (70%) nitric acid in the water phase. It is preferred to use an acid which will either vaporize during the vaporizing operation or subsequent sintering, or in any event does not tend to leave residual undesired contaminent elements in the sintered product. Preferably an inorganic mineral acid, such as nitric acid or hydrochloric acid, is employed to disperse the alumina.

A colloidal alumina formerly sold by DuPont under the trade designation "Baymal" is another suitable dispersible alpha-alumina monohydrate for use in our process.

As demonstrated above, sodium beta-alumina compositions of different proportions of sodium oxide and alumina may be prepared by adjusting the amount of oxygen-containing sodium salt (based on its $Na_2O$ content or equivalent) that is added to the dispersion of alpha-alumina monohydrate of known $Al_2O_3$ content. The molar ratio of alumina (actually $Al_2O_3$ + $Li_2O$ + MgO + any other modifier) to sodium oxide ($Na_2O$) in the dispersion should be adjusted such that this ratio in the sintered ceramic product is in the range of 5 to 11.

As was illustrated in the second example, dopant materials, such as lithium ($Li_2O$ in the sintered product) and magnesium (MgO in the sintered product), can be included in the dried powder and sintered body by adding suitable readily determined amounts of their water soluble oxygen-containing salts to the colloidal solution of alpha-alumina monohydrate. When employed, the amount of such dopants (in their oxide form) is preferably up to about 2% by weight of the total sodium beta-alumina ceramic. A reason for adding this minor oxide constituent is to modify the electrical ionic resistivity of the ceramic and/or its crystal structure. These constituents stabilize the layered rhombohedral structure, generally known as the beta" phase, which has much lower sodium ion resistivity in the temperature range of 300° to 400° C.

Preferably, the sodium (and optionally lithium, magnesium or other materials) is added to the alpha-alumina monohydrate sol in the form of a water soluble salt dissolved in water. The solution readily mixes uniformly with the alumina sol. Further, the addition of the salt solution usually causes the alumina sol to form a thixotropic gel which is easily dried by freeze drying, spray drying or other conventional drying techniques.

It is apparent that the sodium and other additives are to be present in the final calcined powder or sintered product as oxides. Therefore, it is preferred that such constituents be added as oxygen-containing salts so that the chemical efficiency of the process is increased and the addition of unwanted elements is avoided. While in principle the sodium could be added as a halide salt and converted to the oxide upon sintering, it is preferred to add an aqueous solution of sodium hydroxide or, less preferably, sodium carbonate or sodium nitrate in the first instance. The same applies to lithium. Magnesium and other additives are likewise added as water soluble, oxygen-containing, inorganic salts, e.g., $Mg(NO_3)_2$.

In the preferred embodiments described above, solutions or dispersions containing only water as the dispersant were employed. It will be appreciated that water miscible alcohols or the like could have been used. In fact, the term "aqueous" as used throughout this specification is to be understood to include the use of mixtures of water with water-miscible organic solvents. However, in general, there is little practical benefit from using any dispersant but water in the practice of our process.

In the detailed examples above the dried powder was molded into a separator tube (solid electrolyte) prior to being heated to convert the constituents to beta-alumina. There may, of course, be applications in which it is preferred or necessary to calcine the powder as is to form beta-alumina. Such processing is considered within the purview of our invention.

The formation of beta-alumina compositions usually involves at some point in the processing the combination at high temperature of the constituent oxides or suitable oxide precursor compounds to produce a desired crystal phase or mixture of beta-alumina phases. The materials employed at the beginning of this interaction, whether it is in the nature of a calcining, sintering or other elevated temperature operation, are typically in the solid state. However, a greater or lesser amount of a liquid composition may be formed temporarily during the processing. Normally, as the reaction is completed the product composition is uniformly that of a solid beta-alumina.

Obviously, a mixture of different suitable solid materials may be combined and heated to form a particular beta-alumina product. Some of the constituents may be formulated to temporarily liquefy during the reaction to facilitate sintering and densification, or other beneficial results. The practice of our process has been illustrated by the preparation of a single powder containing the respective oxides (or oxide precursors) in the molar proportions desired to be obtained in the sodium beta-alumina product. However, our process is not limited to this practice. The gel forming and drying part of the process could be used to make two or more different powder compositions which would then be easily blended and calcined, or shaped and sintered, to form a suitable beta-alumina. With this in mind it is apparent that the subject gel forming and drying procedure could be used to form a given powder that may contain alumina and sodium oxide (as well as lithium and/or magnesium oxide) in molar proportions well outside those necessary to form sodium beta-alumina. This first powder would then be blended with one or more different compositions such that the overall composition produces a sodium beta-alumina. When this practice is followed, it is necessary that the two or more different gels or gel-like mixtures be sprayed dried. This is because the resulting separate powder products each consist of microspheres that permit the different powder compositions to be simply blended (without ball milling) into a uniform mixture.

Our method offers several very significant advantages in the preparation of sodium beta-alumina articles, such as separators for sodium-sulfur batteries. Uniform mixtures of the constituents are obtained without ball milling operations. Thus, time is saved and contamination of the product by the milling operation is avoided. The process can readily be extended to the preparation of any beta-alumina composition simply be adding suitable salts of the desired constituent to the colloidal suspension of the alpha-alumina monohydrate. The process avoids the need to employ organic chemicals as have been employed in prior art coprecipitation and gel forming techniques. In such prior art processes the organic chemicals are relatively expensive and they are oxidized and destroyed in the process. In our process there is little need to introduce any contaminating constituents and little or no waste of elements that are added. Moreover, the method is easy and reproducible.

While our invention has been described in terms of certain preferred embodiments thereof, it will be appreciated that other forms could readily be adapted by one skilled in the art. Accordingly, it is to be understood that the scope of our invention is limited only by the following claims.

What is claimed is:
1. A method of making a powdered precursor material containing a uniform mixture of constituents for producing a sodium beta-alumina comprising
   dispersing an alpha-alumina monohydrate in a dilute acidic aqueous solution, the alumina monohydrate having sufficient surface area to form a colloidal solution (sol),
   adding an aqueous solution containing an inorganic oxygen-containing sodium salt to said sol to form a uniform mixture of the sodium salt and alumina,
   and spray drying the mixture to form a powder which is convertible as is upon calcination at a suitable elevated temperature to a desired sodium beta-alumina composition or which can be blended with one or more powder compositions prepared by the same process steps, the resulting blend being convertible upon calcination to a desired sodium beta-alumina.

2. A method of making a powdered precursor material containing a uniform mixture of constituents for producing a sodium beta-alumina comprising
   dispersing a high surface area alpha-alumina monohydrate in a dilute acidic aqueous solution to form a colloidal solution (sol) of the alumina,
   adding an aqueous solution containing an inorganic oxygen-containing sodium salt to said sol to form a uniform mixture of the sodium salt and alumina having an $Al_2O_3/Na_2O$ molar ratio in the range of about 5 to 11,
   and drying the mixture to form a powder which upon calcination at a suitable elevated temperature is converted to a desired sodium beta-alumina composition.

3. A method of making a powdered precursor material containing a uniform mixture of constituents for producing a sodium beta-alumina comprising
   dispersing a high surface area alpha-alumina monohydrate in a dilute acidic aqueous solution to form a sol,
   adding an aqueous solution containing an inorganic oxygen-containing sodium salt and an inorganic oxygen-containing salt of an element taken from the group consisting of lithium and magnesium to said sol to form a uniform gel mixture of the alumina and the salts, the respective salts being added in an amount to provide an $(Al_2O_3 + Li_2O + MgO)/Na_2O$ molar ratio in the range of about 5 to 11,
   and drying the gel to form a powder which upon calcination at a suitable elevated temperature is converted to a desired sodium beta-alumina composition.

4. A method of forming a sodium beta-alumina article comprising
   adding a water dispersible alpha-alumina monohydrate to an acidic aqueous solution to form a colloidal solution (sol) of the alumina,
   adding an aqueous solution containing an inorganic oxygen-containing sodium salt to said sol to form a uniform mixture, the sodium salt being added in an amount to provide an $Al_2O_3/Na_2O$ molar ratio in the range of 5 to 11,
   drying the mixture to form a powder,
   pressing a quantity of the powder into a porous article of predetermined configuration,
   heating the pressed article as necessary to drive off volatile material,
   and then sintering the article at an elevated temperature to densify it and to form the desired sodium beta-alumina.

5. A method of forming a sodium beta-alumina article comprising
   adding a water dispersible alpha-alumina monohydrate to an acidic aqueous solution to form a colloidal solution (sol) of the alumina, adding an aqueous solution containing an inorganic oxygen-containing sodium salt and an inorganic oxygen-containing salt of an element taken from the group consisting of lithium and magnesium to said sol to form a uniform mixture of the alumina and the salts, the respective salts being added in an amount to provide an $(Al_2O_3 + Li_2O + MgO)/Na_2O$ molar ratio in the range of 5 to 11, drying the mixture to form a powder, pressing a quantity of the powder into a porous article of predetermined configuration, heating the pressed article as necessary to drive off volatile material, and then sintering the article at an elevated temperature to densify it and to form the desired sodium beta-alumina.

6. A method of forming a sodium beta-alumina article comprising adding a water dispersible alpha-alumina monohydrate to an aqueous solution of an inorganic acid to form a colloidal solution (sol) of the alumina, adding an aqueous solution containing an inorganic oxygen-containing sodium salt and optionally an inorganic oxygen-containing salt of an element taken from the group consisting of lithium and magnesium to said sol to form a uniform mixture, spray drying the mixture to form a powder of free flowing microspheres, blending the powder, if necessary, with one or more other powder compositions prepared by the same process steps to obtain a blended powder composition having an $(Al_2O_3 + Li_2O + MgO)/Na_2O$ molar ratio in the range of about 5 to 11, pressing a quantity of the powder composition into a porous article of predetermined configuration, and sintering the article at an elevated temperature to densify it and to form the desired sodium beta-alumina.

* * * * *